United States Patent [19]

Harley, Jr. et al.

[11] Patent Number: 5,282,194
[45] Date of Patent: Jan. 25, 1994

[54] INTERACTIVE PROTOCOL ANALYSIS SYSTEM

[75] Inventors: Thomas J. Harley, Jr., Palo Alto; Gregory L. Nelson, Milpitas, both of Calif.

[73] Assignee: Loral Aerospace Corporation, New York, N.Y.

[21] Appl. No.: 931,044

[22] Filed: Aug. 17, 1992

[51] Int. Cl.⁵ .............................................. H04J 1/16
[52] U.S. Cl. .................................. 370/17; 340/825.15; 364/715.11
[58] Field of Search ............... 370/13, 17, 60, 94.1, 370/105.1, 105.4; 375/10, 116; 364/715.09, 715.1, 715.11; 371/20.1, 29.1, 16.1, 17; 340/825.06, 825.15, 825.17, 700, 752, 756

[56] References Cited

U.S. PATENT DOCUMENTS

| | | | |
|---|---|---|---|
| 4,312,074 | 1/1982 | Pautler et al. | 364/715.11 |
| 4,672,611 | 6/1987 | Fukuhara et al. | 371/89.1 |
| 4,679,191 | 7/1987 | Nelson et al. | 370/84 |
| 4,775,973 | 10/1988 | Tomberlin et al. | 370/94.1 |
| 4,792,753 | 12/1988 | Iwai | 324/73 R |
| 4,887,260 | 12/1989 | Carden et al. | 370/94.1 |
| 4,916,694 | 4/1990 | Roth | 370/94.1 |
| 4,920,537 | 4/1990 | Darling et al. | 371/5.1 |
| 5,040,111 | 8/1991 | Al-Salameth et al. | 395/325 |
| 5,097,469 | 3/1992 | Douglas | 371/20.1 |

Primary Examiner—Douglas W. Olms
Assistant Examiner—Hassan Kizou
Attorney, Agent, or Firm—Perman & Green

[57] ABSTRACT

A method and apparatus for analyzing a bit stream having an unknown format that is conveyed through a communications network. The method includes the steps of: (a) storing a plurality of sequentially occurring bits received from a communications network; (b) analyzing a plurality of the stored bits to detect periodicities in the bits; and (c) determining if the detected periodicities exhibit characteristics associated with a known type of data communications format, particularly a synchronous time-division-multiplexed (TDM) data communications format or a packetized data communications format. The step of analyzing includes a step of performing a statistical analysis of the stored bits.

20 Claims, 12 Drawing Sheets

ILLUSTRATION OF SELECTION OF MULTIPLE ROWS AND COLUMNS

FIG. 12.

| ASCII Display | | Numeric display Eight bits/number Eight bit intervals | |
|---|---|---|---|
| A1 | | | A2 |
| T | 170 | 000 | 025 |
| s | 170 | 017 | 025 |
| s | 170 | 034 | 025 |
| ∆ | 170 | 051 | 025 |
| s | 170 | 076 | 025 |
| g | 170 | 093 | 025 |
| T | 170 | 110 | 025 |
| s | 170 | 127 | 025 |

ILLUSTRATION OF CHARACTER FORMAT AND NUMERICAL FORMAT DISPLAYS OF FUNCTION VALUES

FIG. 13.

ILLUSTRATION OF A GRAPHICAL DISPLAY OF FUNCTION VALUES

INTERACTIVE PROTOCOL ANALYSIS SYSTEM

FIELD OF THE INVENTION

This invention relates generally to computer and data communications networks and systems and, in particular, to methods and apparatus for recognizing and recovering digital communications formats, protocols, and data from a network bit stream.

BACKGROUND OF THE INVENTION

Known types of computer/communications network monitors are available to provide on-line analysis of bit-error-rates (BERs). Also, protocol analyzers are available for Wide Areas Networks (WANs) and Local Area Networks (LANs) that provide simulated network components, perform BER tests, and perform link level performance analysis. However, these conventional types of monitors and analyzers work only with known communications protocols.

Examples of conventional systems include the following. In U.S. Pat. No. 4,920,537 there is described a method for in-service measurement of the BER of a data stream in a digital communications circuit. This method is said to allow bit error rates to be measured without the need to insert a known test signal onto the communications channel. This is accomplished through the use of two, synchronized test sets to recover and compare block-check codes.

In U.S. Pat. No. 4,916,694 there is described a method for measuring the statistics of traffic loading on a packet network without actually decoding the data. This is accomplished by detecting the presence of a signal carrier on a packet network, and recording the time of the detected event. This approach assumes the presence of an ON/OFF carrier where the carrier in ON only when a packet is being sent. That is, this patent does not consider the case of a synchronous circuits where there is a continuous carrier. The method described by this patent does not attempt to identify the protocol or its characteristics.

In U.S. Pat. No. 4,792,753 there is described a system for accomplishing an automatic, real-time analysis of traffic loading on a local area network by recovering individual packets, and measuring a time between packets and packet length. However, this approach requires specific, a priori knowledge of the packet structure.

What is not provided by known types of network and protocol analyzers, and what is thus a first object of the invention to provide, is a method and apparatus to recover data format and network protocol information from a data stream for a case where the specific protocols on the network under examination are unknown, and in fact, may never have been previously encountered by an operator analyst.

A further object of the invention is to provide a method and apparatus whereby an operator analyst is enabled to detect and observe various elements that are common to many time-division-multiplex (TDM) and packet protocol formats.

SUMMARY OF THE INVENTION

The foregoing and other problems are overcome and the objects of the invention are realized by a method and apparatus for supporting an operator analyst in the recovery of unknown digital communications formats and protocols through an interactive analysis of intercepted bit streams. Also provided is a tool for accomplishing an interactive analysis and debugging of computer/communications networks.

More specifically the invention provides a method, and apparatus for accomplishing the method, for analyzing a bit stream conveyed through a communications network. The method includes the steps of: (a) storing a plurality of sequentially occurring bits received from a communications network; (b) analyzing a plurality of the stored bits to detect periodicities in the bits; and (c) determining if the detected periodicities exhibit characteristics associated with a data communications format.

The step of determining includes the steps of determining if the detected periodicities are representative of a predetermined bit pattern associated with a synchronous time-division-multiplexed (TDM) data communications format, and determining if the detected periodicities are representative of a predetermined bit pattern associated with a packetized data communications format.

The step of analyzing includes a step of performing a statistical analysis of the stored bits. The step of performing a statistical analysis employs a technique selected from a group of techniques that includes a Pattern Histogram Function, a Pattern Pair Histogram Function, a Pattern versus Period Histogram Function, a Pattern Group Histogram Function, a Pattern Group versus Time Function, and a Bit Run-Length Histogram Function. Combinations of the foregoing may also be employed.

The step of determining includes the steps of: (a) specifying a number of consecutive bits to form a bit group; (b) specifying a content of the bit group; and (c) displaying a sequence of bits that include an occurrence of the bit group having the specified content. The step of displaying a sequence of bits includes a step of displaying a predetermined number of bits that precede the bit group having the specified content, and a step of displaying a predetermined number of bits that follow the bit group having the specified content.

The step of displaying employs a display format selected from a group of display formats that includes: a binary format wherein individual bits are displayed as either a "1" or a "0", a numerical format wherein a plurality of consecutively occurring bits are displayed as a numerical equivalent thereof, a character format wherein a plurality of consecutively occurring bits are displayed as an equivalent character, and a graphical format. Combinations of the foregoing may also be simultaneously employed within defined arrays and sub-arrays of displayed bit patterns.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram of the interactive protocol analysis block shown in FIG. 1a;

DETAILED DESCRIPTION OF THE INVENTION

Figure 1A:
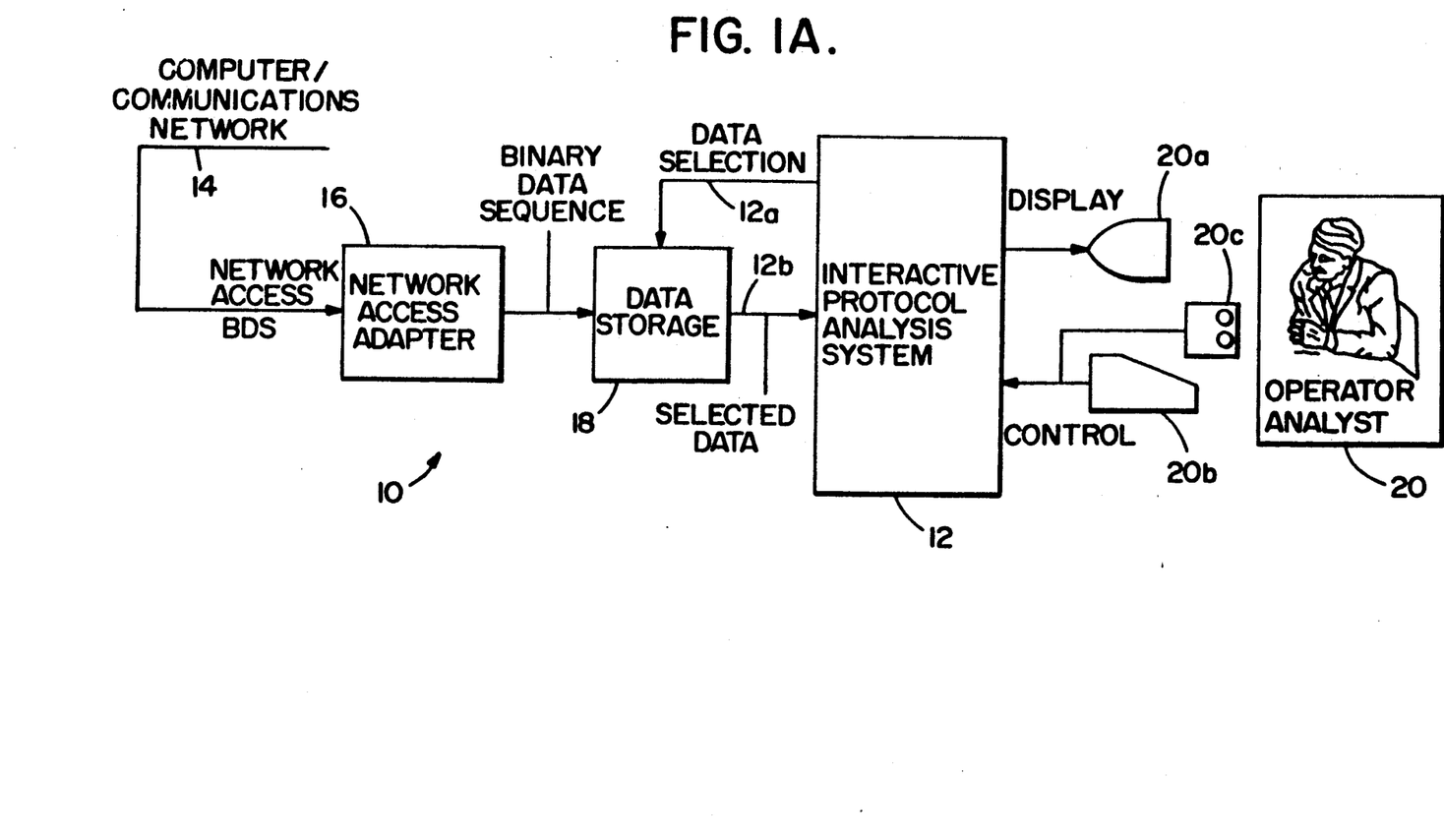
FIG. 1a is a block diagram that illustrates a system having an interactive protocol analysis block that is constructed and operated in accordance with the invention.

FIG. 1a is a block diagram of a system 10 that includes an Interactive Protocol Analysis System (IPAS) 12 of the invention. The input to the system 10 is a binary data sequence (BDS) recovered from a computer/communications network 14 under analysis. The BDS is recovered by a network access adapter 16 of a type suitable for interfacing to the particular physical and electrical characteristics of the network 14. The recovered BDS is stored in a data storage unit 18. The IPAS 12 accesses data from the data storage unit 18 for analysis through the use of a data selection signal 12a, such as a group of address signal lines. The selected data is received as a selected data signal 12b that is conveyed by, for example, a group of data signal lines. The IPAS 12 processes the selected data in accordance with the methods of the invention that are described in detail below and displays processed results to, and receives control inputs from, a human operator/analyst, or operator 20.

The IPAS 12 is preferably implemented in software running on a digital computer having a graphical display console 20a. As will become apparent, many of the IPAS 12 operations deal with bits, as opposed to bytes, integers, or floating-point numbers; therefore, a bit-function accelerator unit may be optionally employed with the digital computer to facilitate these operations.

The operator 20 interacts with the IPAS 12 by typing on a computer keyboard 20b, and/or by positioning a cursor with a pointing device 20c. The IPAS 12 preferably employs modern computer display techniques to provide multiple windows for viewing data in different formats and for scrolling displays within windows. The operator 20 is thus enabled to scroll and/or page the contents of the windows.

Figure 1B:
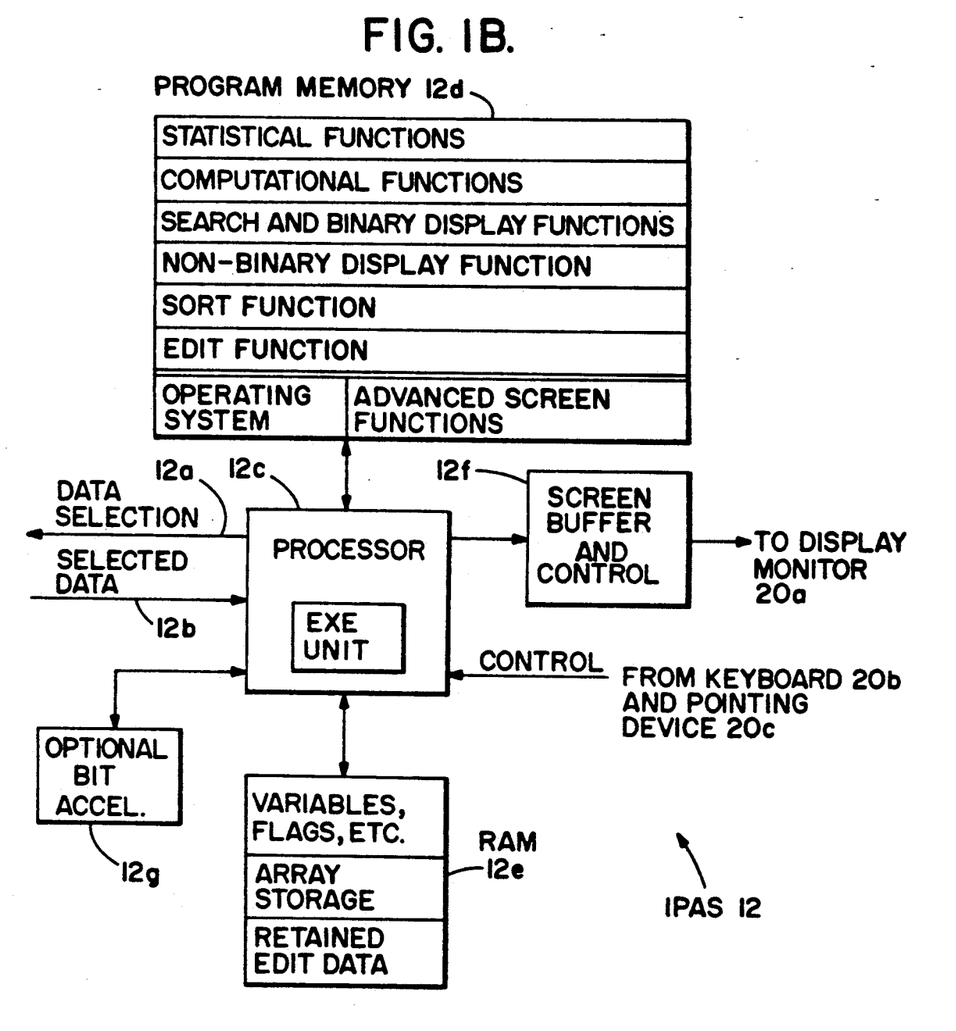

FIG. 1b is a block diagram that illustrates in greater detail the major functional units of the IPAS 12. The IPAS 12 includes a processor 12c having an execution unit. Bidirectionally coupled to the processor 12c is a program memory 12d that stores instructions for executing the various functions that are described in detail below. These include statistical analysis functions, computational functions, search and binary display functions, a non-binary display function, a sort function, and an edit function. Program memory 12d also stores an appropriate operating system and, if employed, advanced screen functions for performing windowing and other display related operations. Also bidirectionally coupled to the processor 12c is a RAM 12e that stores variables, flags, and other related information. RAM 12e also provides storage for operator-specified arrays of bits and storage for retaining bits that are deleted by the operation of the edit function. These bits are retained for use in restoring an edited bit array, as described below. The processor 12c has an output coupled to a screen buffer and controller 12f which in turn provides display information to the display monitor 20a. Processor 12c receives control information from the keyboard 20b and/or the pointing device 20c. The processor 12c sources the data selection signal 12a to the data storage unit 18 for specifying a portion of the intercepted data stream that is stored therein. The selected portion is received by the processor 12c over the selected data signal line 12b and may be stored in the RAM 12e. If employed, the optional bit-function accelerator unit 12g is also bidirectionally coupled to the processor 12c.

It should be realized that the embodiment of FIG. 1b is but one suitable embodiment for the IPAS 12, and that the teaching of the invention is not intended to be limited to only this particular embodiment. That is, the functionality of the embodiment of FIG. 1b may be realized with a number of different types of available data processors.

In general, the IPAS 12 provides computational and control functions that enable the operator 20 to examine a network data stream to locate key elements of a packet or a TDM format.

As employed herein a packet is considered to be a group of binary digits including data and control signals which is switched as a composite whole. The data, control signals, and possibly error control information are arranged in a specified format. A typical packet format includes a destination address, a source address, a link number, a packet number, a text portion, and start-of-packet and end-of-packet framing sequences. Error detecting code redundancy check (CRC) bits may also be appended to the packet. The exact content and arrangement of information within the packet is a function of the particular format or protocol in use.

As employed herein time division multiplexing is considered to be a communications technique wherein time is divided periodically into slots or frames, and wherein each of the frames is occupied by a portion of a communications signal. As a result, only one signal occupies the communications channel during a specific frame, while other signals, or the same signal, may occupy the channel during other frames. Information within each frame includes control and other information, such as frame markers, channel address, text, and CRC information.

The IPAS 12 operates in two phases.

A first phase (Phase 1) determines whether the unknown bit stream has a TDM or packet structure. This requires a detection and identification of periodicities in the bit stream. These detected periodicities are candidates for further investigation to determine if the periodicities exhibit characteristics associated with a synchronous TDM format, or, alternatively, with flag patterns that may be used as start-of-packet or end-of-packet markers.

A second phase (Phase 2) involves a detailed examination of bit stream patterns to confirm or reject various TDM or packet structure hypotheses. As is described below, functionality is provided in the IPAS 12 to support the operator 20 during both Phase 1 and Phase 2.

Briefly, and by way of introduction, a Statistical Analysis Function supports Phase 1, wherein the operator 20 is attempting to determine the bit stream structure.

The Statistical Analysis Function provides displays of recovered bit stream data and the statistical properties of bit patterns within the unknown bit stream.

Other IPAS 12 functions are employed during Phase 2 to support a more detailed analysis of various hypotheses concerning the bit stream structure. Specifically, a Search and Binary Display Function locates and displays a binary representation of segments of the input data stream that contain a common bit pattern, such as a packet flag or a TDM frame marker. A Computational Function and a Non-Binary Display Function cooperate with one another to enable the operator 20 to selectively view the same data as in the Binary Display Function, but in numerical, symbolic, or graphical forms corresponding to one or more of the basic elements of packet and frame headers. A Sort Function enables the operator 20 to arrange potential packets in numerical order e.g., by address, or by sequence number. An Edit Function enables the operator 20 to edit individual bits, columns of bits, or segments of bits by deletion.

These various functions of the IPAS 12 are now described in detail with reference to FIGS. 2-15.

Statistical Analysis Function

Figure 2:
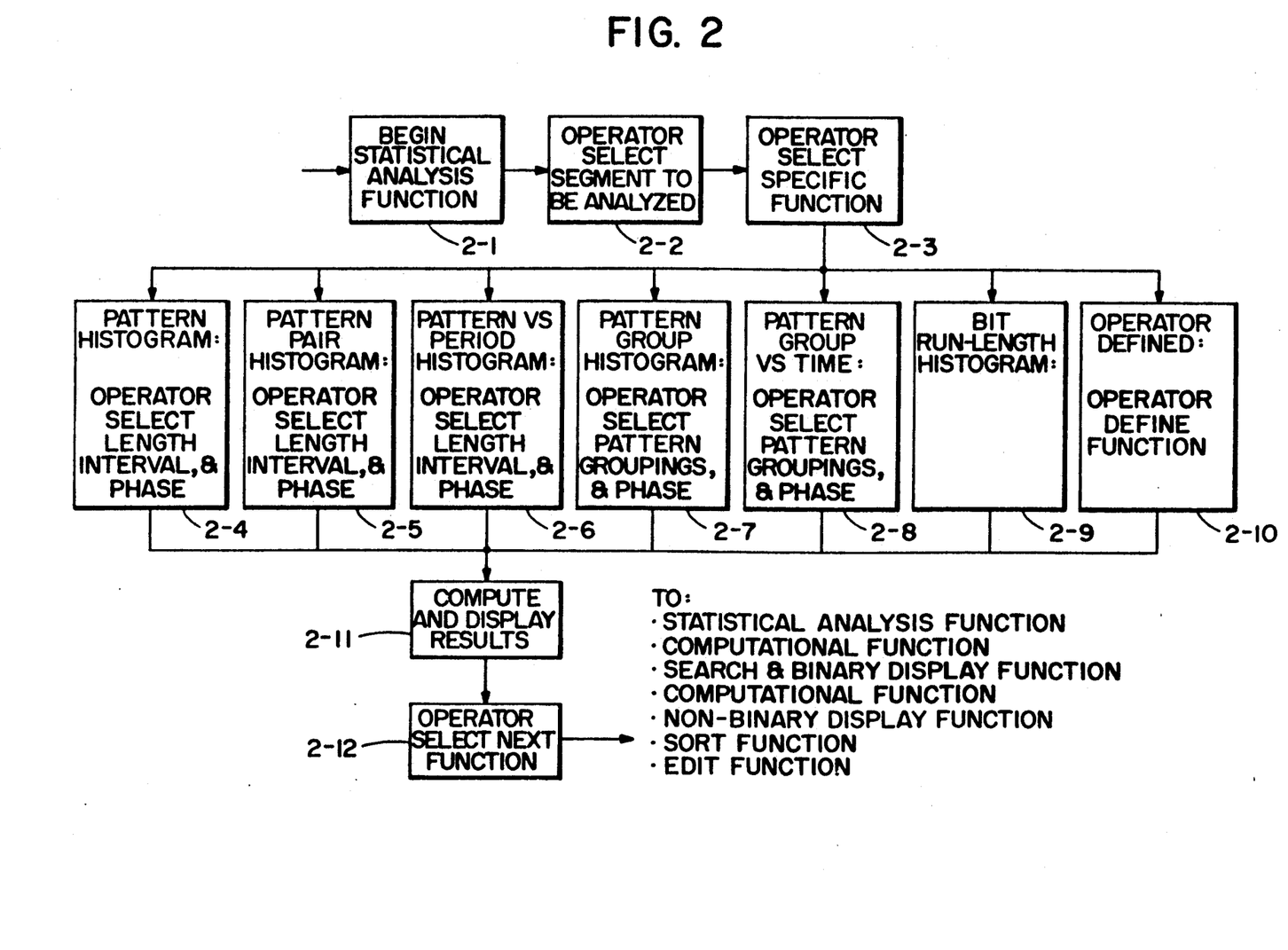
FIG. 2 is a flow chart of an IPAS statistical Analysis Function.

FIG. 2 is a flow chart illustrating the operation of IPAS 12 in performing the Statistical Analysis Function. At Block 2-1 the operator 20 initiates Phase 1 by selecting the Statistical Analysis Function from a displayed menu of available functions through the use of the keyboard 20b or the pointing device 20c. Responsive to the operator's selection, the Statistical Analysis Function is begun. At Block 2-2 the operator 20 specifies a segment of the bit stream to be analyzed so that the examination of the bit stream can be localized to areas of specific interest. At this point in the process, the operator may know little of the underlying data stream format, or he may have a priori information (e.g., previous analysis results, the source of the binary data stream) that suggests what to expect. Typically, the operator will specify that the sequence to be analyzed is to begin with the first bits available. If there is reason to believe that the early part of the bit stream is not usable, then the operator may select a subsequent starting point. The number of bits to be analyzed is chosen by the operator to assure significance of the specific statistical analysis function the operator has selected. At Block 2-3 the operator 20 selects among several alternative statistical analysis functions (Blocks 2-4 to 2-10) to be applied to the selected segment of the unknown bit stream. The selected one of the Blocks 2-4 to 2-10 works in conjunction with the Block 2-11 to compute and display the result of the selected statistical analysis function.

Figure 3:
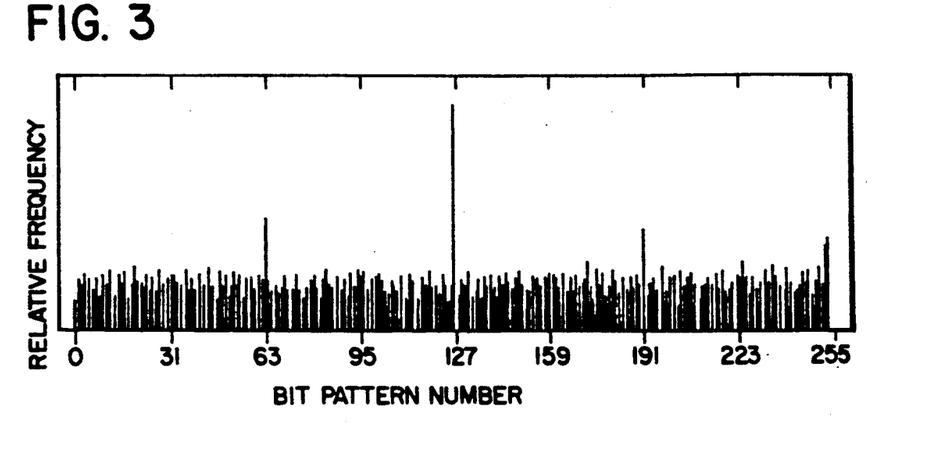
FIG. 3 is an example of a bit pattern histogram.

If Block 2-4 is selected, a Pattern Histogram Function is executed and displayed. A typical display is illustrated in FIG. 3. The output display shows the relative frequency of various bit patterns within the unknown bit stream. The operator 20 has the option of selecting a length of the patterns to be counted and an interval between patterns, and also the phase, or starting point, for marking off the pattern intervals within the bit stream.

For certain analysis, the operator 20 requires results based on one bit intervals. For other analyses the operator 20 may find it more effective to obtain results for selected bit intervals. By example, many TDM and packet formats are based on octets, i.e., eight-bit patterns at eight-bit intervals. A histogram based on this specific assumption is thus advantageous for identifying TDM and packet format delimiters, if they form a portion of the unknown bit stream captured from the network 14. The operator 20 has the ability to select both the pattern length and the pattern interval independently of one another.

The pattern in FIG. 3 represents what the operator 20 sees displayed on the Display 20a if the unknown bit pattern consists of International Standard (CCITT) X.25 frames. The standard X.25 flag pattern 01111110 (decimal 126) predominates, with patterns such as 10111111 (decimal 191) and 11111101 (decimal 253) also showing relatively high values. In that X.25 does not allow any consecutive bit sequence of 1s greater than six, the unknown bit sequence can be seen not to contain any patterns of 11111111 (255), 111111110 (254), or 011111111 (127).

It can be appreciated that the display of FIG. 3 provides a powerful tool to the operator 20 when it is desired to at first identify the network format.

Block 2-7 executes a Pattern Group Histogram Function having a display, similar to the display of FIG. 3, that shows the relative frequency of selected pattern groups. One useful group is the 8-bit ASCII representation of the characters "A" through "Z", and "a" through "z". Two other useful groups are 1) the standard X.25 flag pattern 01111110, and 2) groups containing more than six 1s. If these bit patterns appear in far greater or far smaller proportion relative to their expected frequency in a random number sequence, the operator 20 can infer characteristics of the underlying data. The operator 20 is provided the capability to define specific pattern groups.

Figure 4:
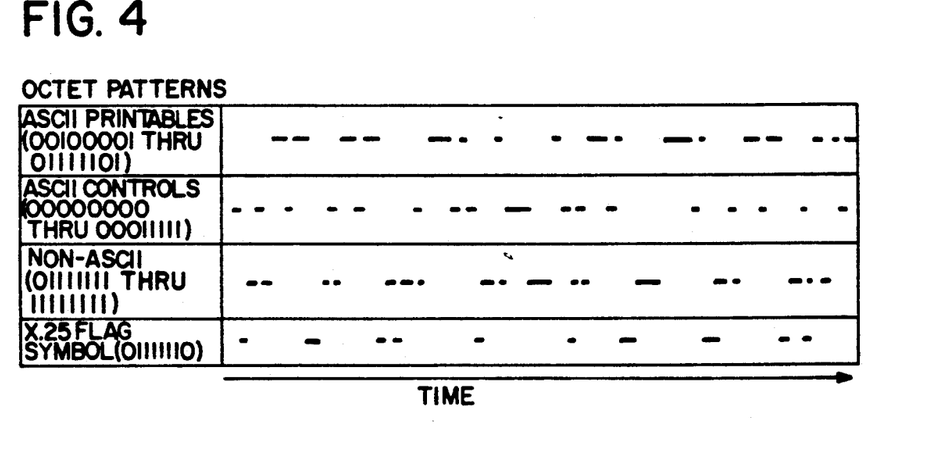
FIG. 4 is an example of a pattern groups vs. time display.

Block 2-8 executes a Pattern Group versus Time Function having a display of a type shown in FIG. 4. This Function enables the operator 20 to observe whether certain pattern types cluster in specific regions of the bit stream. The example in FIG. 4 is based on octet patterns, in four groups: the eight-bit ASCII printable characters, the eight-bit ASCII control characters, the X.25 packet flag octet, 01111110 (126), and the unassigned octets above 01111111 to 11111111 (127 through 255). In this illustration, the operator 20 observes the aperiodic repetition of the packet flag octet, and also observes that the packet flag octets are normally followed by ASCII control or symbol characters.

Figure 5A:
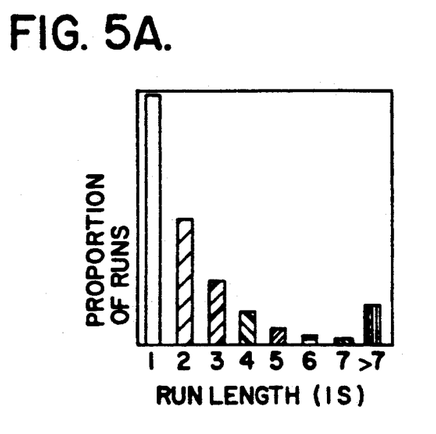
FIG. 5 is an example of run-length histograms.
Figure 5B:
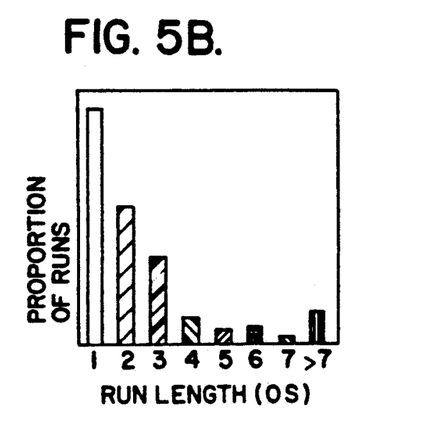

Block 2-9 selects and executes a Run-Length Histogram Function having a display of a type illustrated in FIG. 5. This Function displays a number of times each run length occurs for ones and for zeros. In this illustration, it is clear that the unknown network bit sequence is not derived from an X.25 network, because there are many occurrences of a sequence of 1s longer than the maximum of six that are specified by the X.25 format.

Figure 6:
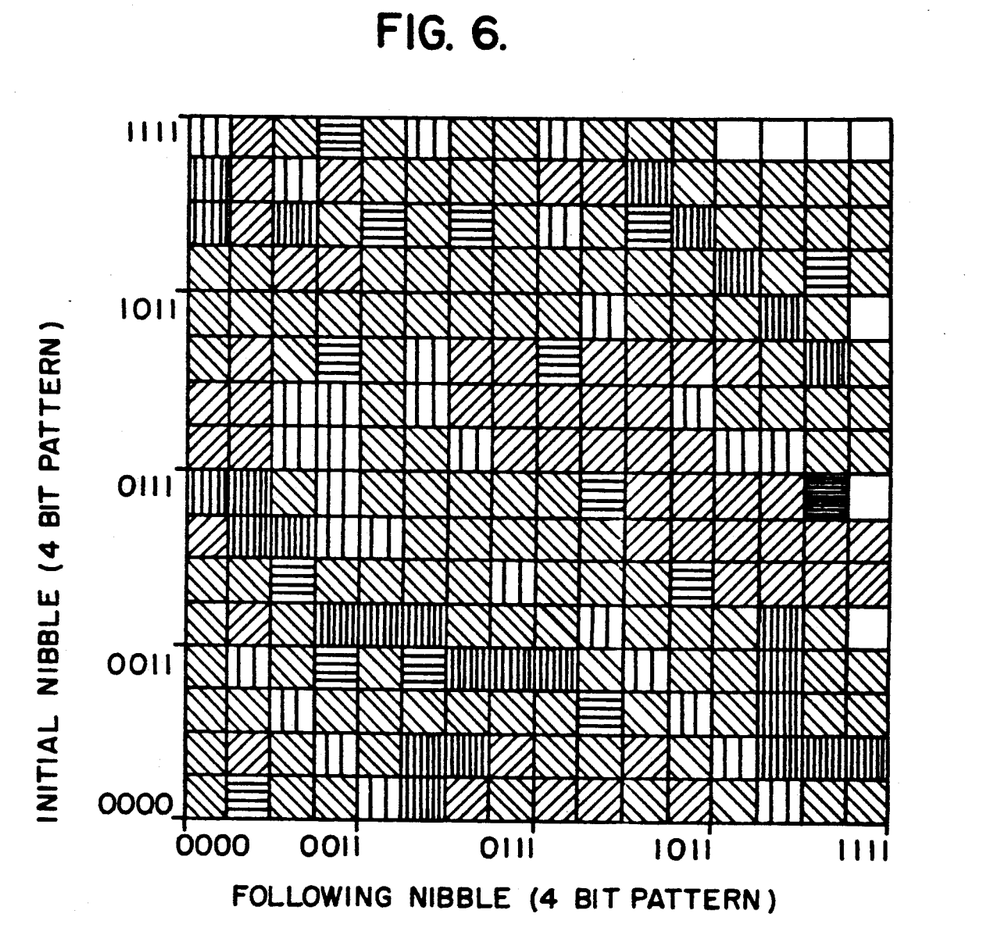
FIG. 6 is an example of pattern pair histogram.

Block 2-5 executes a Pattern Pair Histogram Function having a display illustrated in FIG. 6. There are two dependent variables: 1) an initial bit pattern and 2) a following bit pattern. The dependent axis is the frequency with which each pattern pair occurs in the unknown bit stream. The data can be displayed as levels of gray, as shown, or as colors on a two-dimensional grid, or as a three-dimensional bar chart. For the illustrated example, the greater the frequency of occurrence, the darker is the corresponding grid cell. By example, the initial four bit pattern "0100" followed by the four bit pattern "0011" can be seen to have a greater frequency of occurrence than the pattern "0011" followed by "0011", which in turn has a greater frequency of occurrence than the pattern "0010" followed by "0011".

Block 2-6 executes a Pattern versus Period Histogram Function having a display that is similar in appearance to the display of the Pattern Pair Histogram of FIG. 6. One of the independent axes corresponds to the bit patterns, while the other represents the time separation, in bits, between consecutive occurrences of the pattern. By example, a frame marker or flag in a synchronous TDM bit stream is found to occur at roughly equal intervals of time, and is also found to reoccur at a fixed interval far more often than any other pattern in the bit stream. The periodicity in some types of packet traffic are also made apparent with this display.

Finally, the IPAS 12 provides the operator 20 with the ability to create new displays to support the search process (Block 2-10). The operator 20 is prompted to define a dependent variable in the form of a numerical function of one or two independent variables derived from the bit stream information.

At Block 2-12 the operator 20 selects a next IPAS 12 function from a displayed menu of functions so as to remain in Phase 1, by selecting the Statistical Analysis Function, or to enter Phase 2 by selecting one of the other functions. These other functions that are executed in Phase 2 are now described in detail.

Search and Binary Display Function

Figure 7:
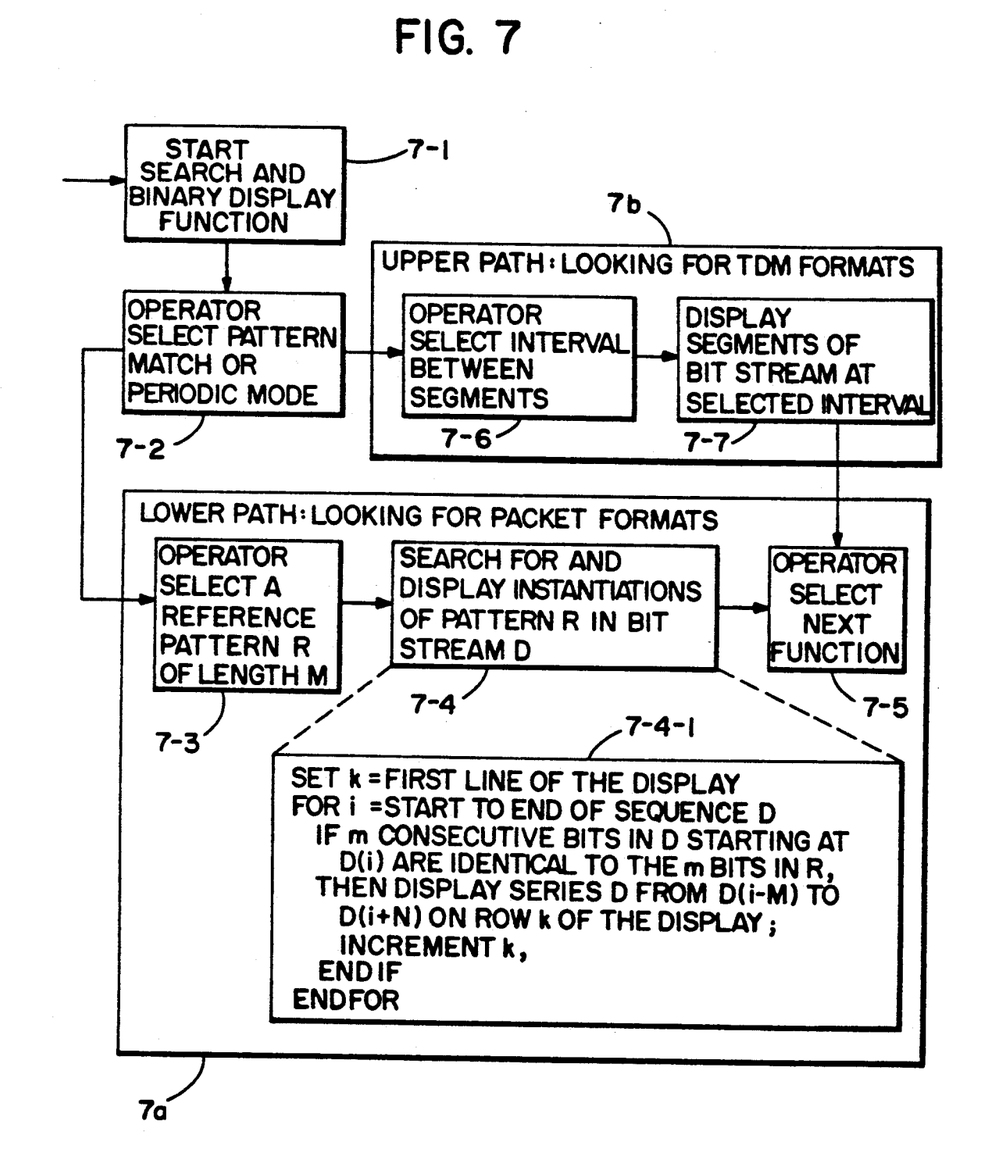
FIG. 7 is a flow chart of a Search and Binary display function.

FIG. 7 shows a flow diagram of the Search Function. At Block 7-1 the operator 20 initiates the Search and Binary Display Function, and at Block 7-2 the operator 20 selected either a Pattern Match or a Periodic Mode of operation. In this regard there are two alternate methods for selecting multiple segments of the bit sequence for detailed analysis. The first method is oriented towards discovering packet formats, and is generally encompassed by the blocks of the Lower Path 7a. The second method is oriented towards discovering the formats used in synchronous time-division-multiplexed (TDM) data streams, and is generally encompassed by the blocks of the Upper Path 7b.

Following the Lower Path 7a, at Block 7-3 the operator 20 commands the IPAS 12 to select all instantiations within the input data sequence of an operator-specified bit pattern, that is, a reference pattern R of length (m). The pattern may include any number of ones, zeros, and "don't care" bits.

At Block 7-4, and in response to the command, the IPAS 12 displays, on a single row, the entire sequence of bits beginning with the M-th bit preceding and ending with the N-th bit following each instantiation of the selected bit pattern. The values of M and N are operator 20 selected, with limits determined according to the screen resolution of display 20a. One suitable logical function for implementing Block 7-4 is illustrated in the exemplary pseudocode of Block 7-4-1. As a result, sequences associated with consecutive instantiations of the specified bit pattern are displayed on consecutive rows, with the matching bit patterns aligned vertically into columns. The symbolic representation of the zeros and ones of the bit stream on the display 20a can be numerals ("1" and "0"), or any suitable graphical representation using gradations of black and white, or colors.

Figure 8:
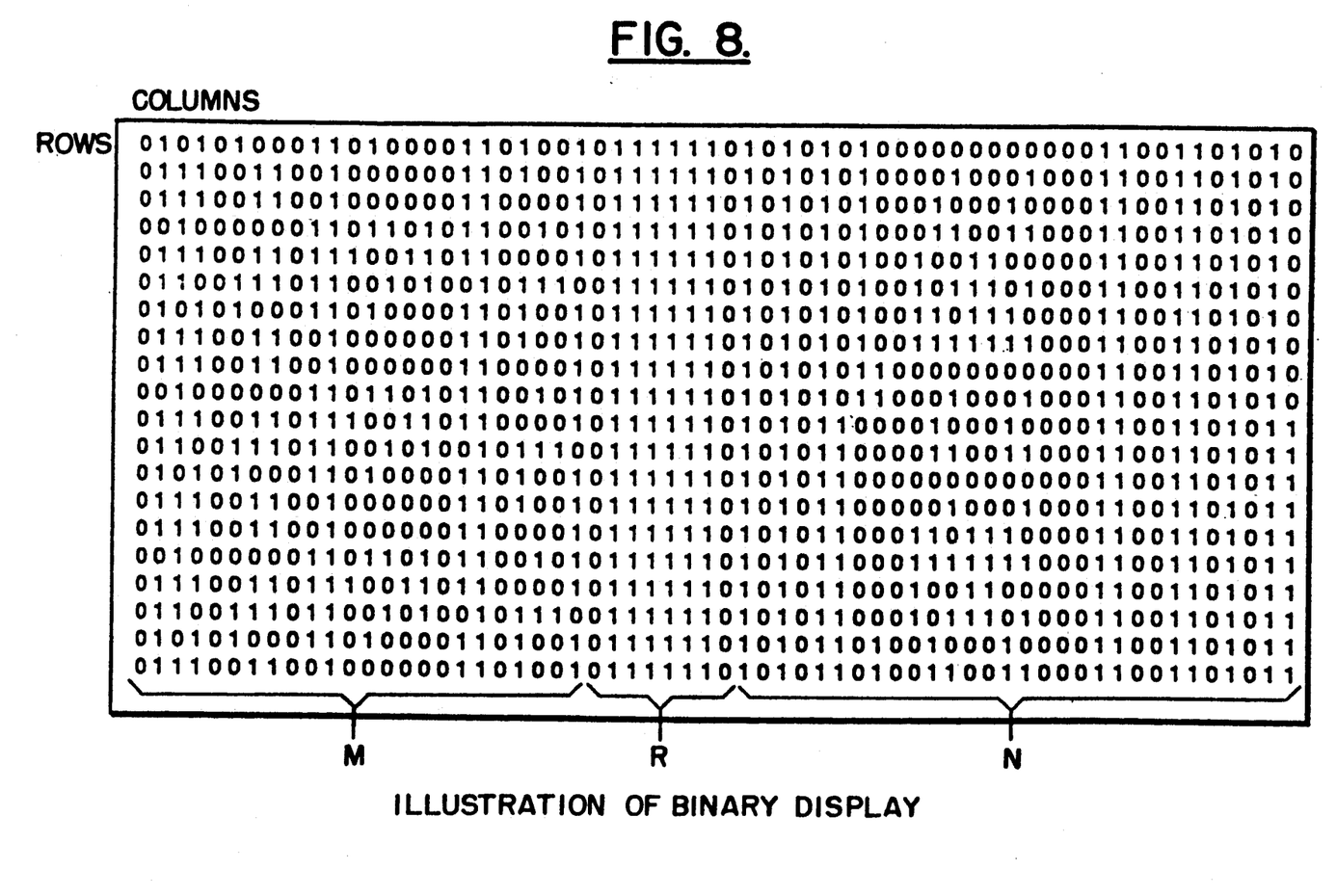
FIG. 8 illustrates an exemplary binary display.

FIG. 8 is an exemplary display employing the numerals "0" and "1" in which twenty consecutive instantiations of the sequence 01111110, a commonly used packet flag, are presented. In this illustration, a total of 62 bits per row are displayed, including 24 preceding bits (M), the eight bit (m) flag pattern (R), and 30 succeeding bits (N).

Although not explicitly shown in FIG. 7 or FIG. 8, it should be realized that the operator 20 is preferably provided with a capability to scroll and/or page the display horizontally (beyond bits M or N) to reveal additional columns of bits in the stack of sequences. If there are more instantiations than can be displayed at one time, then the operator 20 also has the ability to scroll and/or page vertically through the rows of the display. In addition, the operator 20 has the ability to select specific instantiations (rows) of the selected pattern and delete them from the display.

These various display screen functions are inherent in the data processing system upon which the IPAS 12 is implemented, and are not discussed in further detail herein.

At Block 7-5 the operator 20 selects a next function for execution.

If at Block 7-2 the operator 20 selects the periodic mode of operation Block 7-6 is executed. At Block 7-6 the operator 20 enters a selected bit interval between segments of bits. That is, the operator 20 employs an alternate form of the Search function in which the same type of binary display is created (Block 7-7), as in FIG. 8, but where the segment entered on each line of the display is selected from the unknown bit sequence at equal, operator-specified bit intervals. This enables the operator 20 to examine the possibility of a synchronous TDM format, having a distributed synchronization pattern.

Computational Function

Figure 9:
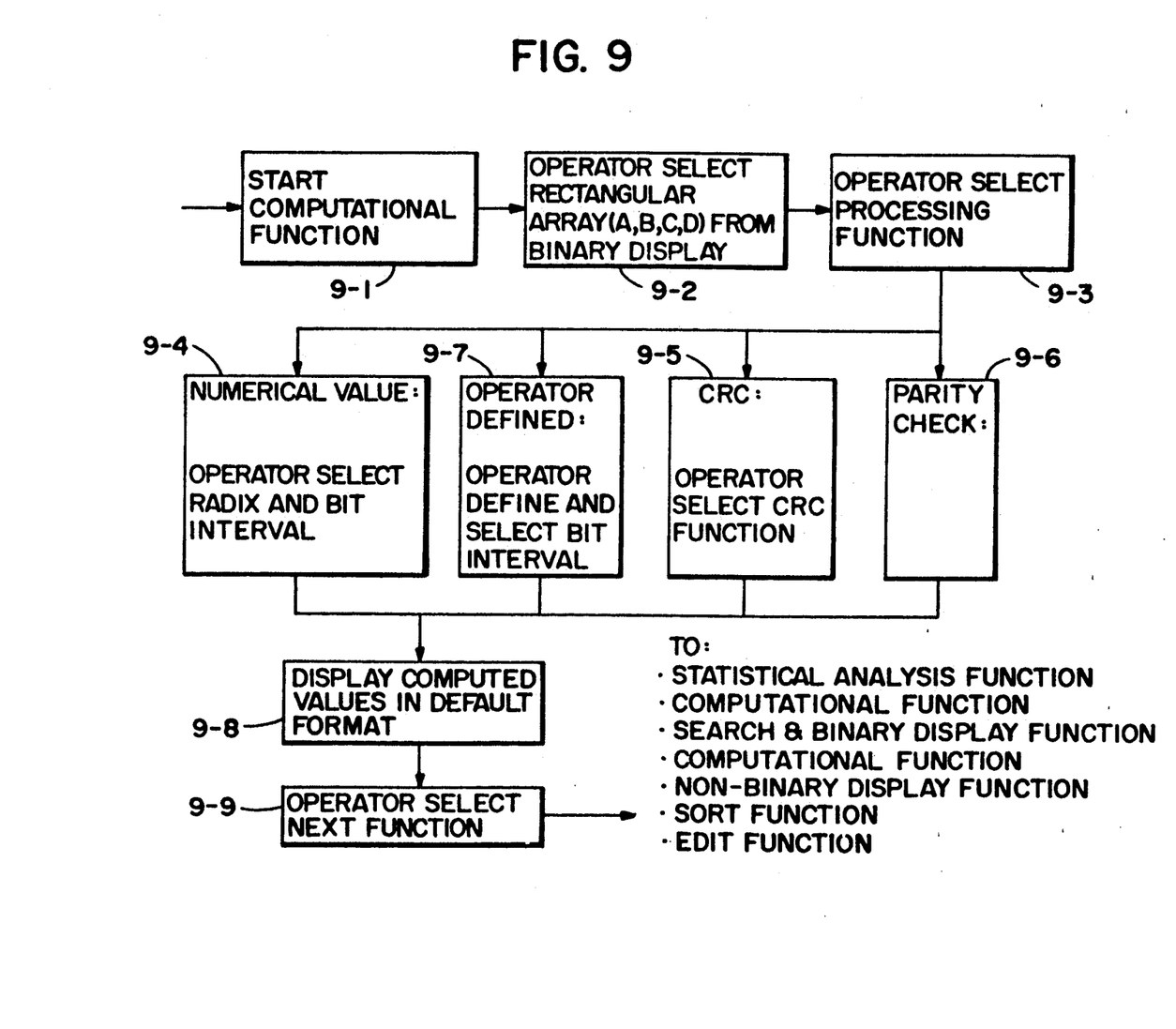
FIG. 9 is a flow chart of an IPAS Computational function.
Figure 10:
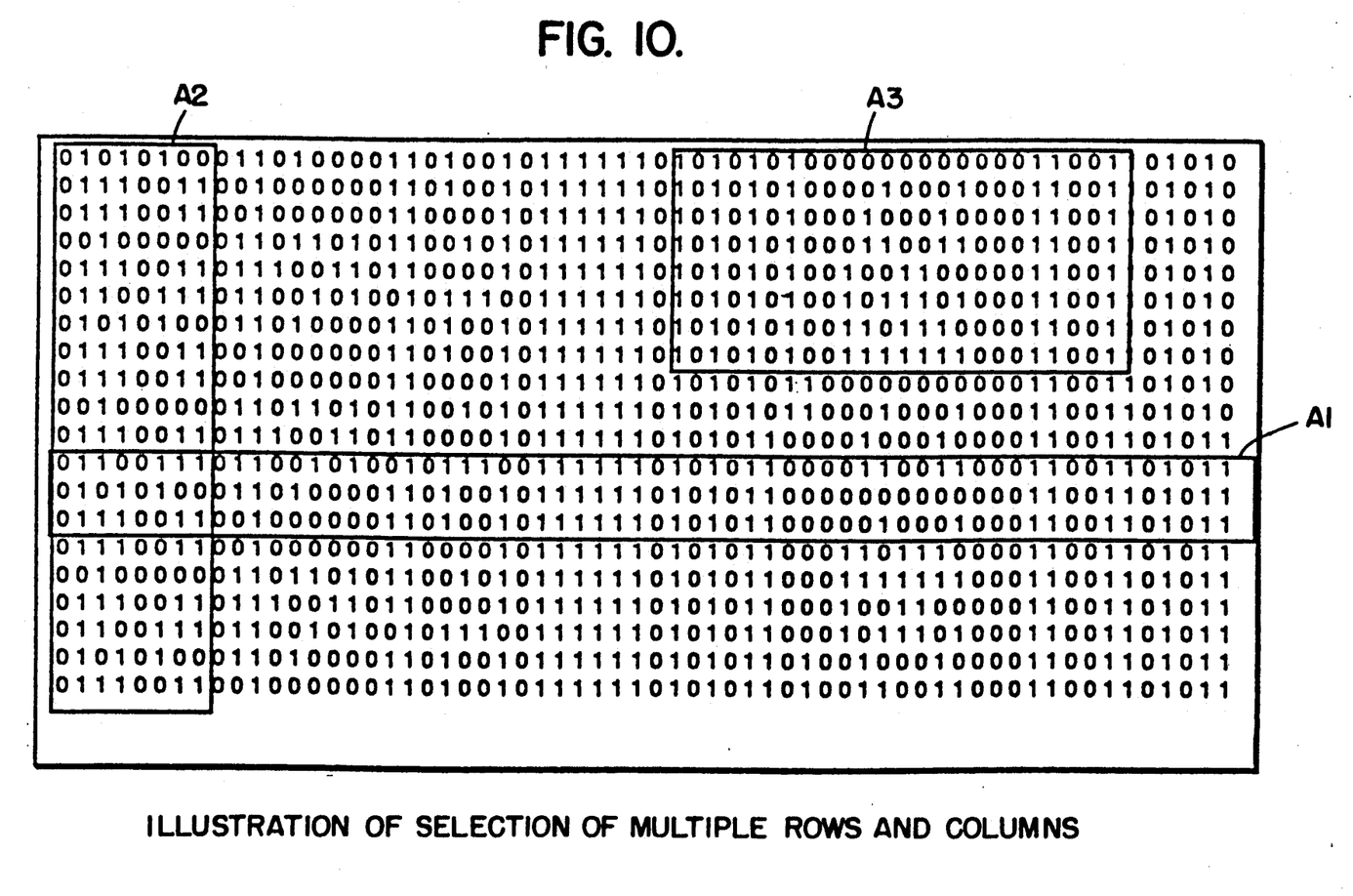
FIG. 10 illustrates an operator selection of multiple rows and columns of a binary display.

The flow diagram for the Computational function is shown in FIG. 9. At Block 9-1 the operator 20 commands the IPAS 12 to compute and display various functions characteristic of data presented in formatted TDM or packetized data streams. At Block 9-2 the operator 20 selects a specific rectangular array within a displayed stack of sequences. The rectangular array may include: 1) all the rows or any selected subset of rows; 2) and all the columns or any selected subset of columns. FIG. 10 provides an example in which the display from FIG. 8 is partitioned in three different manners: once with all of the 11 columns in the 12th through 14th rows (Array A1), once with all of the rows in the first through the eighth columns selected (Array A2); and once with the block bounded by the first and eighth row and the 33rd through the 56th column (Array A3).

At Block 9-3 the operator 20 selects a Computational Function to be applied to the selected array(s) of bits. As a part of this selection the operator 20 may command that all of the bit sequences in each row within an array be converted to numerical values (Block 9-4), and may specify the number of bits applied in the computation, for instance, octets or bytes (eight bits), nibbles (four bits), or triplets (three bits). The operator 20 may also specify the bit interval along each row of an array at which the numerical values are to be computed, for example, every bit position, or every four bits, or every eight bits.

If Block 9-5 is selected the IPAS 12 computes a numerical function, specifically a Cyclic Redundancy Check, for the sequence of bits in each row within the array. If Block 9-6 is selected the IPAS 12 computes a different numerical function, specifically a Parity Check (odd or even), for the sequence of bits in each row within the array. If Block 9-7 is selected the operator 20 is prompted to create and apply operator defined functions relating bit arrays to numerical values.

At Block 9-8 the IPAS 12 displays the results in the specified format, and at Block 9-9 the operator 20 selects a next function to be executed.

Non-binary Display Function

The results of the Computational process may be displayed with, or in place of, the binary data display, or may be displayed in a second display window. A flow chart that is descriptive of the Non-binary Display Function is presented in FIG. 11.

Figure 11:
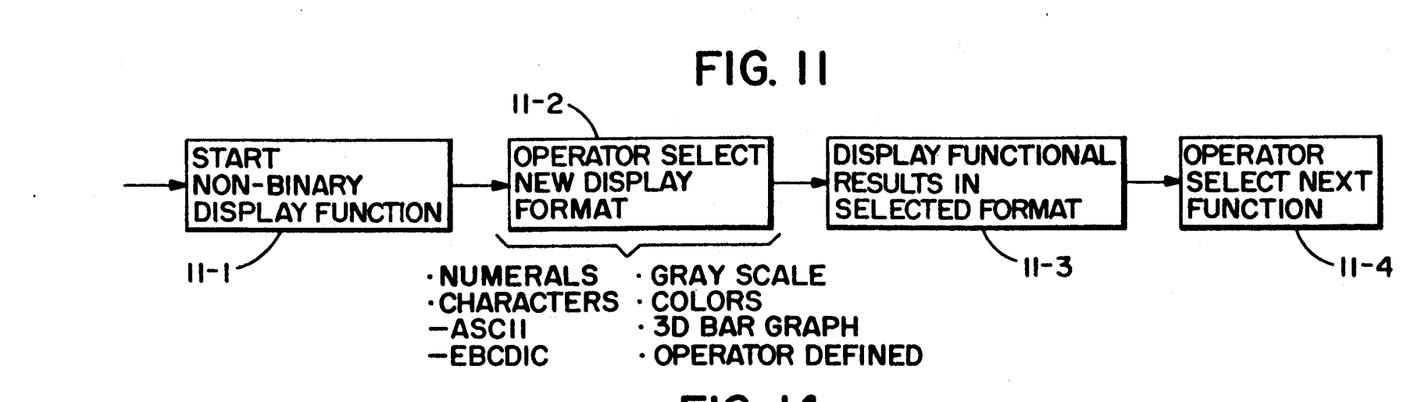
FIG. 11 shows a flow chart of an IPAS Non-Binary display function.

At block 11-1 the operator 20 invokes the Non-binary Display Function, and at Block 11-2 the operator 20 specifies a form in which the numerical values within the selected array are displayed, e.g., as numerals, as characters (according to some character-encoding scheme, such as ASCII or EBCDIC), as graphical patterns, shades of gray, colors, or as bars on a 3D bar chart.

Other selected arrays may be displayed simultaneously in an alternative form based on other numerical functions of the contained bits. If a sub-array is selected within a previously selected larger array, the functions applied within the sub-array are applied locally within only the sub-array, while the previously specified function for the larger array remains unchanged.

Figure 12:
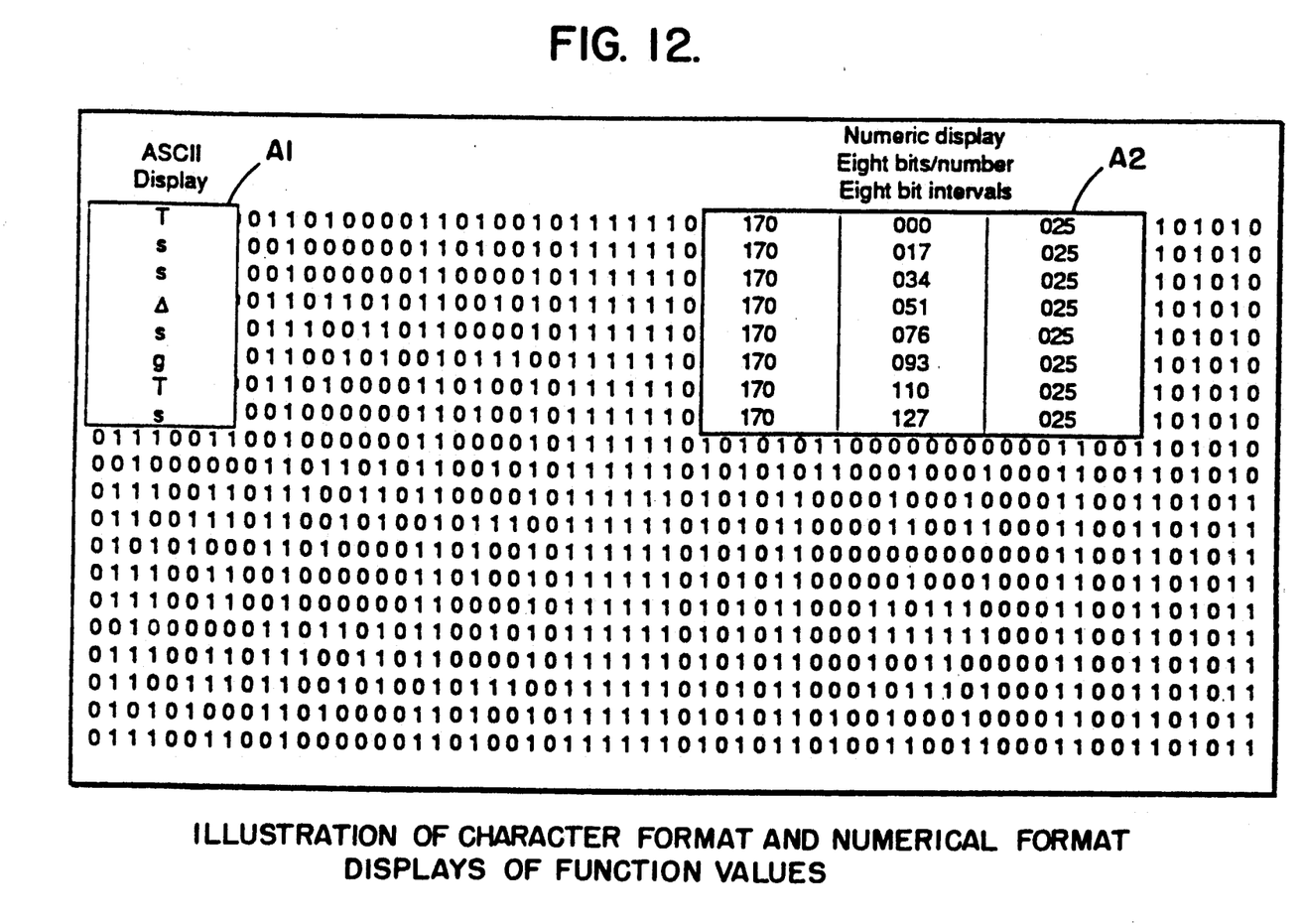
FIG. 12 is an illustration of character format and numerical format displays of function values.

FIG. 12 illustrates two selected arrays that are displayed by the IPAS 12 at Block 11-3. In a first array (A1) a block of eight bits has been selected per row, and converted into ASCII characters. It should be noted that all of the symbols in the first array are valid ASCII character (and space) symbols, suggesting that this array of bits contains ASCII textual data. In the second array (A2) a block of 24 bits has been selected. Each group of eight bits (an octet) has been functionally converted into a number (between 0 and 255). The bit interval between these functions has also been set to eight bits.

Figure 13:
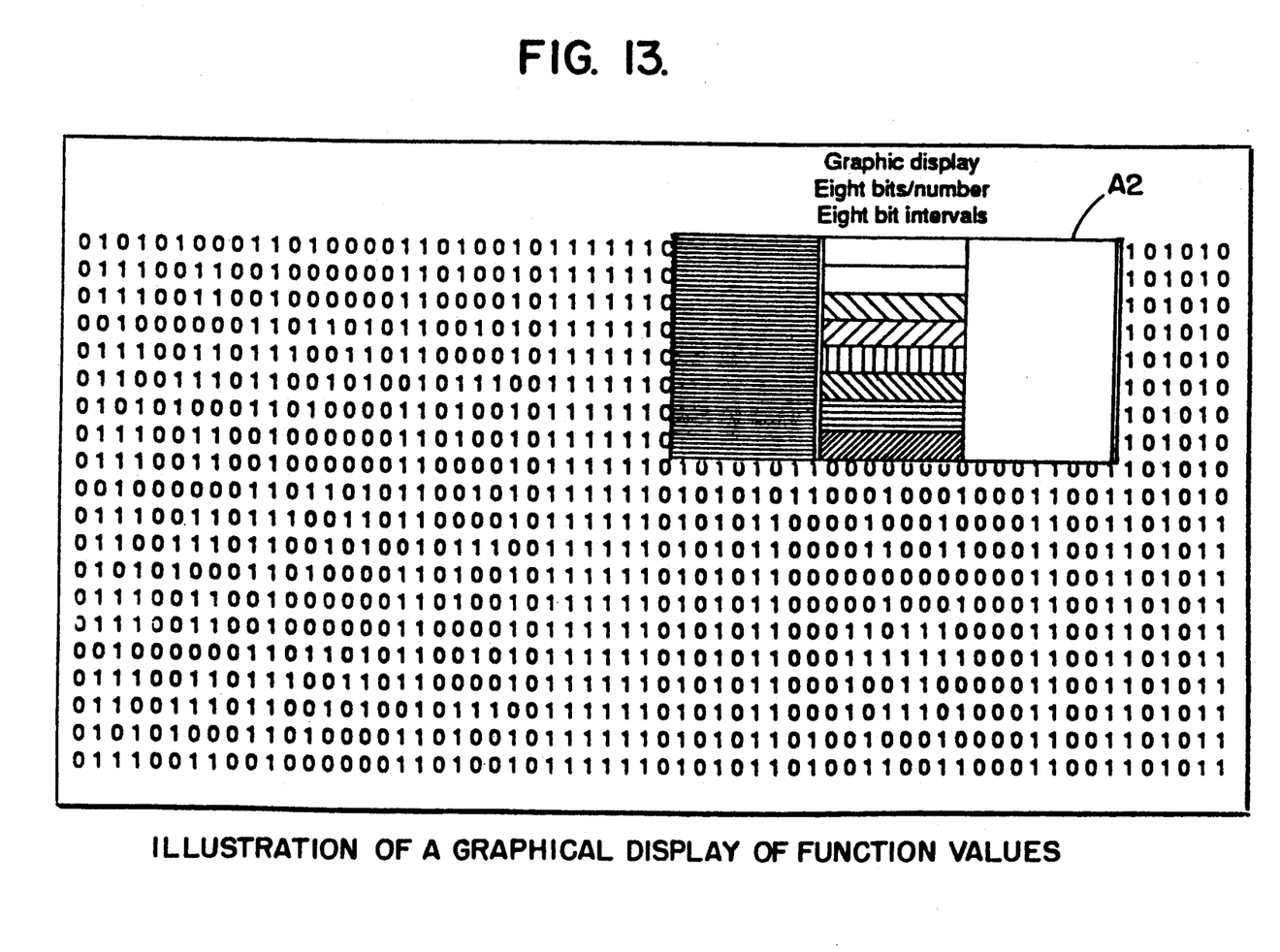
FIG. 13 is an illustration of a graphical display of function values.

FIG. 13 shows an alternative method of viewing the numerical data in the second array (A2) of FIG. 12. Here, each numerical value is represented on a scale of gray from white to black, with white corresponding to a value of 000 and black corresponding to a value of 255. The operator 20 can readily see that the displayed shades linearly darken from the top to the bottom of the middle column. This strongly suggests that there may be a sequence counter underlying this octet position. A spectrum of colors can also be employed in this manner with, by example, red indicating a value of 000 and violet indicating a value of 255.

At Block 11-4 of FIG. 11 the operator selects a next IPAS 12 function to be executed.

Sort Function

Figure 14:
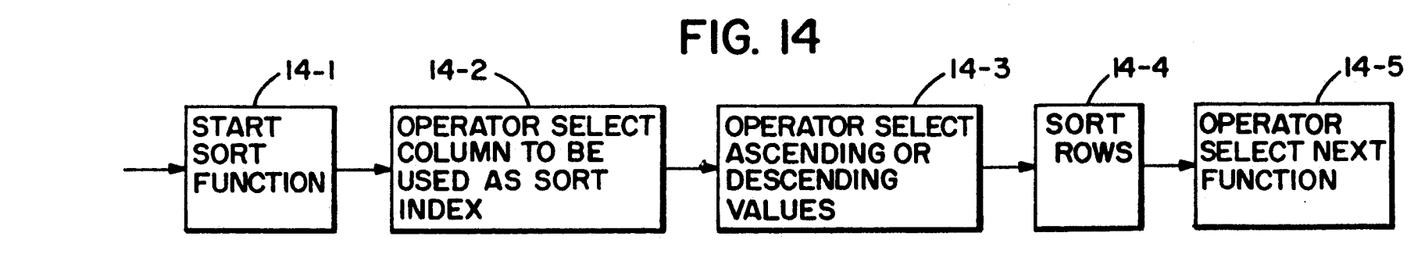
FIG. 14 shows a flow chart of an IPAS Sort function.

FIG. 14 is a flow chart depicting the operation of the Sort Function. At Block 14-1 the operator 20 invokes the Sort Function. At Block 14-2 the operator is prompted to specify a column that will be used as a sort index, (i.e., the specified column in each row will provide the key for sorting the row), and at Block 14-3 the operator 20 is prompted to specify ascending or descending numerical values. At Block 14-4 the IPAS 12 sorts the rows in ascending or in descending numerical order, based on the selected numerical function applied at the specified column location.

The Sort function may be used, by example, to sort packets into sequence order, by sorting on a sequence counter field; or to sort packets by source or destination, by sorting on an address field. In addition, the operator 20 may create an arbitrary sorting order that is not dependent on the content of the data sequence. Further, the operator 20 may command the IPAS 12 to restore the displays to their original time-sequential order, and to thus un-sort the selected rows back into temporal order.

The Sort Function operates so as to affect both the original display of binary segments, and also any displays derived from functions applied to the binary segments, such as the displays of FIGS. 12 and 13.

In addition, the operator 20 may command the IPAS 12 to sort selected columns in either the Binary segment display or the Non-binary display, based on an arbitrary, operator 20 defined sorting order. In that the Non-binary displays are based on functions of the multiple bits in the binary displays, in most cases, sorting of one display is independent of sorting of any other display.

At Block 14-5 of FIG. 14 the operator selects a next IPAS 12 function to be executed.

Edit Function

Figure 15:
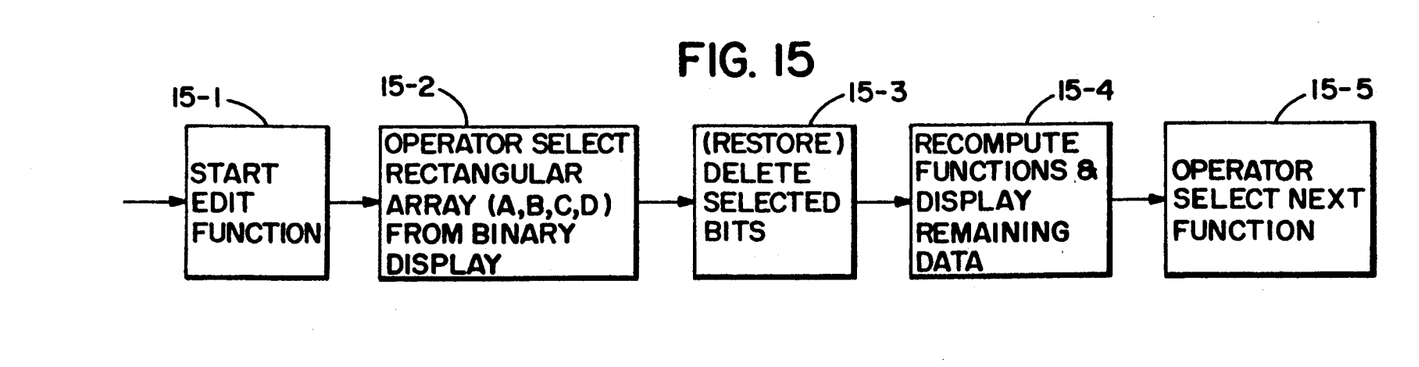
FIG. 15 is a flow chart of an IPAS Edit function.

FIG. 15 is a flow chart depicting the operation of the Edit Function. At Block 15-1 the operator 20 invokes the Edit Function. At Block 15-2 the operator is prompted to specify the coordinates of a rectangular array from the Binary data display, the bit selection being accomplished as in the Computational function. At Block 15-3 the IPAS 12 deletes, or restores, the selected bits from the bits saved in the RAM 12e, and at Block 15-4 the IPAS 12 recomputes a function and displays same.

This bit deletion capability is useful for deleting bits that are present in the binary data stream due to rate justification or "stuffing" or "padding" for protocol reasons. It also enables the operator 20 to remove irrelevant data that is cluttering the display. As one example, bits representing format fields that are relevant to a higher or lower level of protocol (in the ISO/OSI sense) than the level being analyzed can be deleted.

As was noted above, when deleting the specified bits the IPAS 12 retains a copy of the bits in the RAM 12e so that the operator 20 is enabled to restore the binary segments to their previous condition.

When bits are removed from or restored to the binary data stream by the Edit Function, the IPAS 12 automatically updates previously invoked functions and associated displays to show results based on the resulting, edited bit sequence.

In summary, the teaching of the invention provides a mechanism for performing an interactive analysis of a data stream on an intercepted computer or data communications network channel in order to identify unknown, and possibly non-standard, packet or TDM structures. This is accomplished by measuring statistics of bit patterns within the intercepted data stream, and interactively interpreting, sorting, and editing the intercepted bits.

It should be realized that although the invention has been described in the context of a system that provides visual output to a human operator, in other embodiments the operator 20 may be replaced by or supplemented with an "expert system" having a knowledge base of data communications formats and protocols. By example, the intercepted network bit stream can be interpreted by the expert system, through the use of the statistical analysis functions and other functions described above, so as to identify the network protocol. If the protocol is not recognized, the expert system may invoke the other functions described above (Phase 2) and, through a logically structured set of rules, the expert system is enabled to determine the type, format, and extract intelligence from the network being analyzed, in a manner similar to that employed by a signals-/intelligence analyst when confronted with an unknown data communications protocol. If employed, the expert system may be resident within the IPAS 12, or may be embodied in an external system that is bidirectionally coupled to the IPAS 12 for supplying commands thereto and for receiving the processed bit stream information therefrom.

It should also be realized that more or less than the number of Statistical Analysis and other functions described above may be employed, as may more or less than the number of display formats specifically referred to above. By example, the sequences of bits, such as those depicted in FIG. 8, may be displayed vertically along respective columns of the display 20a instead of horizontally along the rows.

Thus, while the invention has been particularly shown and described with respect to a preferred embodiment thereof, it will be understood by those skilled in the art that changes in form and details may be made therein without departing from the scope and spirit of the invention.

What is claimed is:

1. A method for analyzing a bit stream that is conveyed through a communications network, comprising the steps of:
    storing a plurality of sequentially occurring bits received from a communications network, the bits having an unknown format;
    analyzing, with a data processor means, a plurality of the stored bits to detect at least a frequency of occurrence of one or more bit patterns within the plurality of stored bits, a bit pattern being comprised of a plurality of bits; and
    outputting a result of the step of analyzing in a format that is selected to enable a determination of whether a detected frequency of occurrence of at least one bit pattern exhibits a characteristic associated with a data communications format.

2. A method a set forth in claim 1 wherein the step of outputting outputs the result in format selected to enable a determination of whether a detected frequency of occurrence is representative of a predetermined bit pattern associated with a synchronous time-division-multiplexed (TDM) data communications format.

3. A method as set forth in claim 1 wherein the step of outputting outputs the result in format selected to enable a determination of whether a detected frequency of occurrence is representative of a predetermined bit pattern associated with a packetized data communications format.

4. A method as set forth in claim 1 wherein the step of analyzing includes the steps of:
    specifying a number of consecutive bits to form a bit group; and
    specifying a content of the bit group; and wherein the step of outputting includes a step of,
        displaying a sequence of bits that include an occurrence of the bit group having the specified content.

5. A method as set forth in claim 4 wherein the step of displaying a sequence of bits includes a step of displaying a predetermined number of bits that precede the bit group having the specified content, and displaying a predetermined number of bits that follow the bit group having the specified content.

6. A method as set forth in claim 5 wherein the step of displaying uses a format selected from the group consisting essentially of:
    a binary format wherein individual bits are displayed as either a "1" or a "0";
    a numerical format wherein a plurality of consecutively occurring bits are displayed as a numerical equivalent thereof;
    a character format wherein a plurality of consecutively occurring bits are displayed as an equivalent character according to some character-encoding technique;
    a graphical format including gray-scale and color representations of values; and
    combinations thereof.

7. A method as set forth in claim 4 wherein the step of displaying includes the steps of:
    displaying a plurality of sequences of bits that include an occurrence of the bit group having the specified content, each of the plurality of sequences being displayed along one row of a display screen means having a plurality of rows and columns of display screen locations;
    displaying in each sequence of bits a predetermined number of bits that precede the bit group having the specified content;
    displaying in each sequence of bits a predetermined number of bits that follow the bit group having the specified content.

8. A method as set forth in claim 7, wherein the bit group of each sequence of bits, except the first sequence, is displayed directly below the bit group of an immediately preceding sequence of bits.

9. A method as set forth in claim 7 wherein the step of determining includes the steps of:
    specifying one or more two-dimensional arrays of displayed bits by specifying display screen row and column location coordinates; and
    further analyzing bits within the one or more two-dimensional arrays so as to identify bit sequences that are associated with a data communications format.

10. A method as set forth in claim 9 wherein the step of further analyzing includes a step of computing cyclic redundancy check values for bits within a two dimensional array.

11. A method as set forth in claim 9 wherein the step of further analyzing includes a step of computing parity values for bits within a two dimensional array.

12. A method as set forth in claim 1 wherein the step of analyzing includes a step of performing a statistical analysis of the stored bits.

13. A method as set forth in claim 12 wherein the step of performing a statistical analysis employs a technique selected from the group consisting essentially of:
    a) a Pattern Histogram Function;
    b) a Pattern Pair Histogram Function;
    c) a Pattern versus Period Histogram Function;
    d) a Pattern Group Histogram Function;
    e) a Pattern Group versus Time Function;
    f) a Bit Run-Length Histogram Function; and combinations thereof.

14. A method as set forth in claim 13 wherein the techniques (a) through (c) each include an initial step of specifying a number of bits that defines a bit group, a number of bits between two bit groups, and a phase.

15. A method as set forth in claim 13 wherein the techniques (d) and (e) each include an initial step of specifying a bit pattern and a phase.

16. A method as set forth in claim 9 wherein the step of further analyzing includes a step of sorting predetermined groups of bits by an associated numeric value.

17. A method as set forth in claim 9 wherein the step of further analyzing includes a step of editing a displayed sequence of bits to delete specified ones of the bits from the display.

18. A method as set forth in claim 17 wherein the step of further analyzing includes a step of restoring previously deleted bits to the display.

19. A system for analyzing a bit stream conveyed through a communications network, comprising:
   network adapter means for coupling to a communications network for receiving a bit stream therefrom;
   storage means having an input coupled to an output of said network adapter means for storing a plurality of sequentially occurring bits received from the communications network;
   processing means having an input coupled to an output of said storage means for statistically analyzing a plurality of the stored bits to detect a frequency of occurrence of one or more bit patterns within the plurality of stored bits, a bit pattern being comprised of a plurality of bits, said processing means further including means for executing a stored program to perform one or more operations on one or more groups of the stored bits to identify characteristics associated with a data communications format; and
   operator interface means including means for providing, to said processing means, commands from an operator of the system, the commands specifying a type of statistical analysis to be performed on the plurality of stored bits and also specifying an operation to be performed on the stored bits, said operator interface means further including output means having an input coupled to an output of said processing means for outputting a result of a specified type of statistical analysis and a result of a performance of a specified operation.

20. A system for analyzing a bit stream conveyed through a communications network as set forth in claim 19, and further including an expert system means having an input coupled to said output means, said expert system means including a knowledge base of data communications formats and protocols, and further including means for interpreting said output of said output means, in accordance with said knowledge base, to identify a communications protocol that is associated with the bit stream received from the communications network.

* * * * *